(12) United States Patent
Bleus et al.

(10) Patent No.: US 8,262,035 B2
(45) Date of Patent: Sep. 11, 2012

(54) CABLE RETENTION CLIP

(75) Inventors: Heidi Bleus, Ghent (BE); Danny Thijs, Zonhoven (BE); Peter Eyckmans, Lummen (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 12/448,141

(22) PCT Filed: Nov. 20, 2007

(86) PCT No.: PCT/GB2007/050699
§ 371 (c)(1),
(2), (4) Date: Jun. 10, 2009

(87) PCT Pub. No.: WO2008/072004
PCT Pub. Date: Jun. 19, 2008

(65) Prior Publication Data
US 2010/0006709 A1    Jan. 14, 2010

(30) Foreign Application Priority Data

Dec. 11, 2006 (GB) .................................. 0624617.7

(51) Int. Cl.
*F16L 3/22* (2006.01)
*F16L 3/08* (2006.01)
*F16L 3/12* (2006.01)
*F16B 15/00* (2006.01)
*F16B 45/00* (2006.01)

(52) U.S. Cl. .............. 248/68.1; 248/74.1; 248/74.2; 248/74.3; 248/74.4; 248/71; 248/65; 248/70; 248/230.7; 248/230.8

(58) Field of Classification Search ............... 248/68.1, 248/74.1, 74.4, 65, 71, 70, 230.7, 230.8, 248/74.2–74.3, 223.41, 224.51, 224.61, 229.16, 248/229.26
See application file for complete search history.

(56) References Cited

U.S. PATENT DOCUMENTS

| 3,506,227 | A | * | 4/1970 | Jenkins | 248/59 |
| 3,894,706 | A | * | 7/1975 | Mizusawa | 248/68.1 |
| 4,118,838 | A | * | 10/1978 | Schiefer et al. | 24/115 R |
| 5,149,027 | A | * | 9/1992 | Weber | 248/68.1 |
| 6,126,122 | A | * | 10/2000 | Ismert | 248/74.1 |

(Continued)

FOREIGN PATENT DOCUMENTS

DE    19 09 284 A1    9/1970

(Continued)

OTHER PUBLICATIONS

Search Report for PCT/GB2007/050699 issued by the European Patent Office on Feb. 27, 2008.

*Primary Examiner* — Terrell McKinnon
*Assistant Examiner* — Christopher Garft
(74) *Attorney, Agent, or Firm* — Faegre Baker Daniels LLP

(57) ABSTRACT

A cable retention clip (20) attached or attachable to equipment with which a plurality of cables are or will be operatively associated, wherein the clip comprises a row of upstanding open-topped cable guide members (24) and a semi-flexible or substantially rigid closure member (22) (hereinafter "lid") securable on top of the guide members to retain cables when present therein, wherein the lid (22) is selectively securable at two or more different heights relative to the guide member (24), to retain cables of different diameters.

17 Claims, 3 Drawing Sheets

U.S. PATENT DOCUMENTS

| | | | |
|---|---|---|---|
| 6,261,037 B1 * | 7/2001 | Richards et al. | 410/36 |
| 2003/0025048 A1 * | 2/2003 | Knotts | 248/68.1 |
| 2006/0249636 A1 * | 11/2006 | Thiedig et al. | 248/74.4 |
| 2007/0018057 A1 * | 1/2007 | Kovac | 248/68.1 |
| 2007/0215757 A1 * | 9/2007 | Yuta | 248/68.1 |
| 2007/0246614 A1 * | 10/2007 | Allmann et al. | 248/65 |

FOREIGN PATENT DOCUMENTS

| | | |
|---|---|---|
| DE | 199 01 050 A1 | 9/1999 |
| EP | 1 059 477 A | 12/2000 |
| GB | 2 322 484 A | 8/1998 |
| JP | 2006-069527 * | 3/2006 |
| WO | WO 2006125952 A1 * | 11/2006 |

* cited by examiner

CABLE RETENTION CLIP

This invention relates to a cable retention clip for securing electrical or optical cables to equipment with which the cables are operatively associated, for example a telecommunications patch panel.

Flexible cable ties are often used for securing cables to associated equipment, but these can be inconvenient and time-consuming to install, particularly when more than two or three cables are to be separately secured in close proximity to one another. This may be the case, for example, in known telecommunications patch panels, especially in high-density patch panels having perhaps twelve or twenty-four closely-spaced connection jacks, individually connected to respective electrical or optical cables.

The present invention provides a cable retention clip attached or attachable to equipment with which a plurality of cables are or will be operatively associated, wherein the clip comprises a row of upstanding open-topped cable guide members and a semi-flexible or substantially rigid closure member (hereinafter conveniently termed a "lid" without implying any particular shape of the closure member) securable on top of the guide members to retain cables when present therein. The cable guide members preferably have means for attachment, preferably snap-fit attachment, to the said equipment, such attachment means preferably being integral with the cable guide members or with a carrier on which the cable guide members are mounted, preferably integrally mounted.

The cable guide members, attachment means, and carrier if present, will preferably be integrally formed by injection moulding of suitable plastics materials using known techniques, but other materials and manufacturing techniques may be used within the scope of the present invention. The guide members are preferably suitable shaped and sufficiently flexible to allow snap-fitting of cables therein. The lid may also preferably be moulded from plastics material to provide a degree of rigidity or semi-flexibility sufficient for its purpose to retain cables which might otherwise become dislodged from the guide members. Materials other than plastics are not necessarily excluded, but are less preferred, but the semi-flexibility or substantial rigidity of the lid is to be understood as excluding flexible tie wraps, elastic strips, rubber bands, and the like.

In preferred forms of the cable retention clip according to this invention, upstanding lid-retaining clips are associated with, preferably integral with, the cable guide members, and the lid is formed to be engageable with lid-retaining clips, which may be provided in any convenient position around the row of cable guide members, preferably at the respective ends of the row of guide members.

In commercially preferred embodiments of the invention, the lid is selectively securable at two or more different heights relative to the guide members, to retain cables of different diameters. One way of achieving this selective height adjustment may involve the lid-retaining clips having two or more ledges or other formations at different heights engageable by the lid. However, it is preferred in addition, or alternatively, that the lid has clip-engagement members selectively engageable with the lid-retaining clips in at least two different positions, each different position bringing a different portion of the lid into facing juxtaposition with the guide members.

The lids might for example be in the form of triangular or quadrilateral prisms with respectively three or four clip-engagement members on the prism end surfaces set at different heights relative to the three or four main surfaces of the prisms. These prismatic lids may thus be rotated about their longitudinal axis to bring a selected one of the prism main surfaces into facing juxtaposition with the row of cable guide members incorporated in the cable retention clip, and the clip-engagement members nearest to the selected main surface of the lid can then be engaged with a given part of the lid-retaining clips to retain the lid at the height determined by the spacing between the selected main surface and its respective set of clip-engagement members.

In a simpler and more preferred form, the lid is of generally elongated plate-like shape having upper and lower main faces and relatively narrow side faces, and the clip-engagement members are provided at its ends to be selectively engageable with a given part of the lid-retaining clips in two positions to bring either one of the main faces into the said facing juxtaposition at different heights from each other. It is especially preferred that the lid has a single set of clip-engagement members, preferably one clip-engagement member in the form of a projection or rib, at each end of the lid, and that the said main faces respectively lie in planes separated by different distances from the clip engagement members.

For many applications of the cable retention clip according to the present invention, the cable guide members may advantageously be curved or otherwise shaped to permit snap-fitting of cables therein. A plurality of the guide members may advantageously be integrally connected together, preferably on an integrally-formed carrier or base.

The invention naturally includes the cable retention clips hereinbefore described, when installed on the relevant equipment, especially a telecommunications patch panel.

Specific embodiments of the invention will now be described by way of non-limiting example with reference to the accompanying drawings, wherein.

Figure 1:
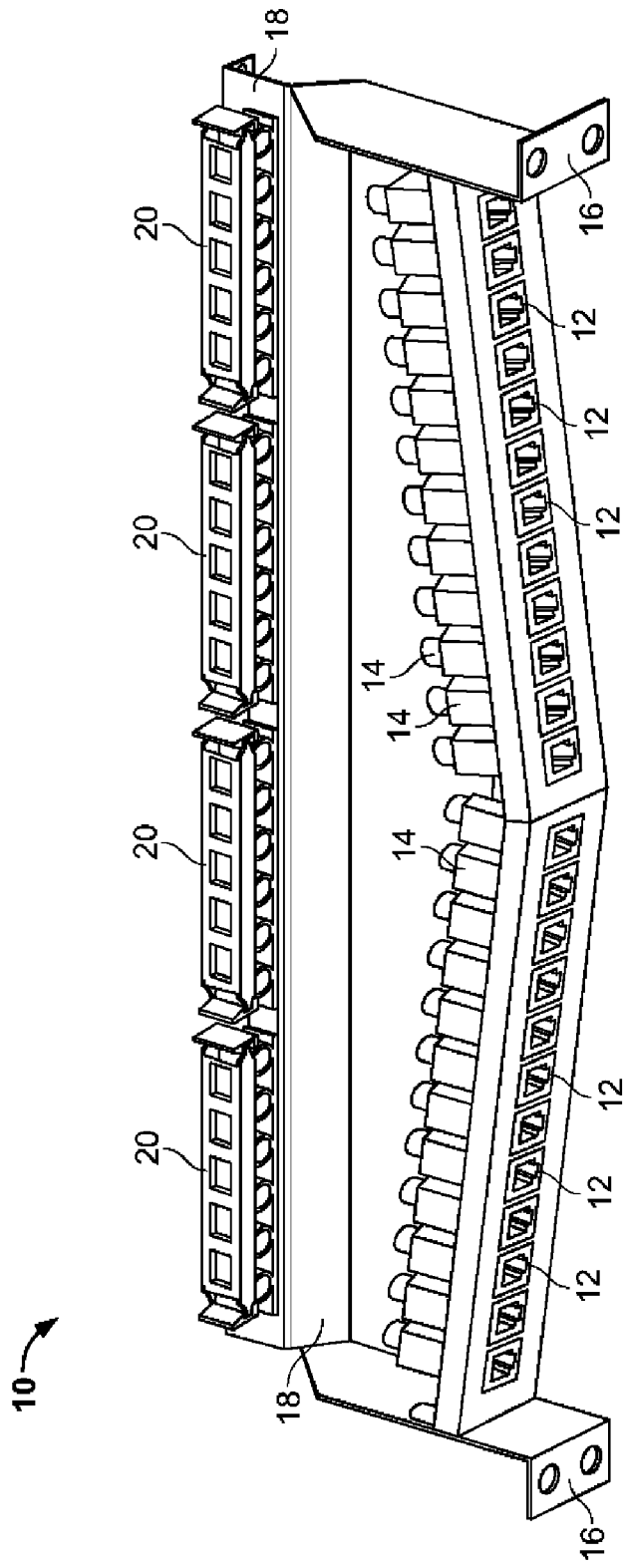
FIG. 1 shows in perspective a telecommunications patch panel of generally known design with the Cable-Retention Clip or "CaRe Clip" (Tyco Electronics product identifier) of the invention mounted on the panel ready for use.

Referring to the drawings, FIG. 1 shows a telecommunications patch panel 10 of generally known form having a row of twenty-four front-facing connection jacks 12 suited to receive the usual RJ connection plugs of patch "cords" or cables (not shown) to be connected to the panel in operation. The jacks 12 have rear-facing connection parts 14 which terminate the system cables (omitted for clarity) to be patched across to other such cables terminated in similar patch panels by means of the patch cords. Brackets 16 are provided for mounting the panel in support frames of the kind generally used in telecommunications centres, and the row of jacks 12 is angled and recessed within the panel brackets 16 in known manner. A support shelf or rail 18 is provided at the rear of the patch panel to support the incoming system cables when present. Four CaRe cable retention clips 20 according to the present invention are shown mounted on the shelf 18, each clip designed to receive and retain up to six incoming system cables.

Figure 2:
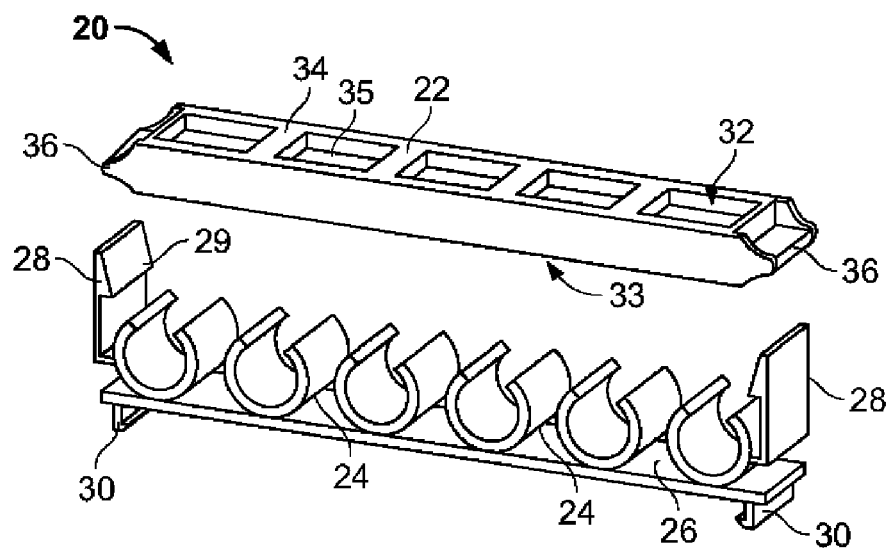
FIG. 2 shows in perspective a CaRe Clip with its lid in position ready for securing on top of the row of cable guide members.

FIG. 2 shows one of the CaRe clips 20 in more detail with the lid 22 dis-assembled from the row of cable guide members 24. The guide members are curved to allow snap-fitting therein of suitable sized cables, and are provided on a carrier 26 with ridged lid-retaining clips 28 upstanding at the respective ends of the row of guide members. Snap-fit attachment lugs or hooks 30 project from the underside of the carrier 26 for snap-fitting insertion into suitable holes or other formations easily provided in or on the support shelf 18 to attach the clips 20 to the shelf as shown in FIG. 1. The guide members, carrier, clips, and lugs are integrally moulded from any suitable semi-rigid plastics material which can readily be selected by persons skilled in such technology. The lid 22 is also moulded from suitable plastics material and has an upper main face 32 and a lower main face 33, in this example with reinforcing ribs 34 between plastics-saving depressions 35. Clip-engagement members 36 are provided at each end of the lid and are set closer to the plane of the lower main face 33 (as shown) than to the plane of the upper main face 32.

Figure 3:
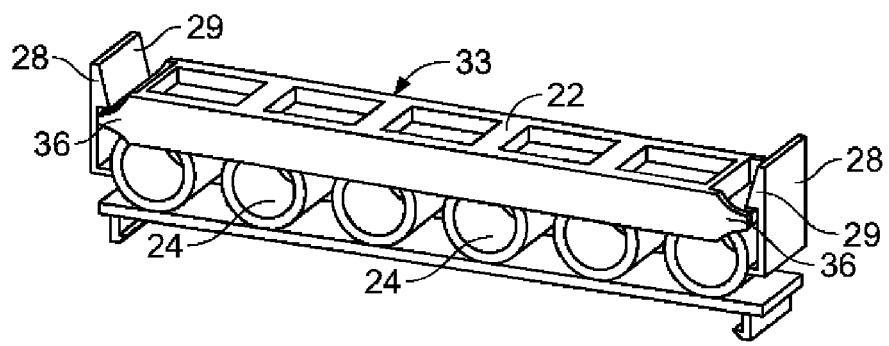
FIG. 3 shows the clip of FIG. 2 with the lid secured at a first selected height above the cable guide members, for example suited to retaining cables of from 5 to 7 mm diameter to be inserted into the guide members.
Figure 4:
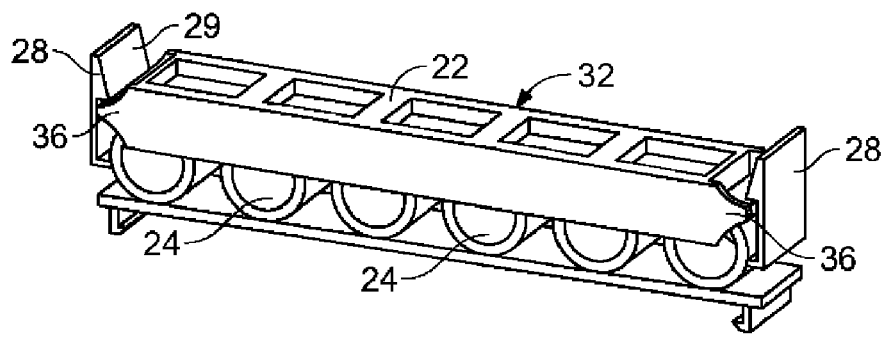
FIG. 4 shows the clip of FIG. 2 with the lid secured at a second selected height above the cable guide members, for example suited to retaining cables of greater than 7 up to 9 mm diameter to be inserted into the guide members.

FIGS. 3 and 4 show the assembled CaRe clip with the clip-engagement members 36 of the lid 22 snap-fitted under the lid-retaining ridges 29 of the sufficiently flexible clips 28. In FIG. 4, the lid is mounted in the same orientation as shown in FIG. 2, with its face 32 uppermost and its lower face 33 facing the row of cable guide members 24, thus securing the lid at the higher of its two selectable heights above the guide members, for example to retain cables of 8-9 mm diameter. In FIG. 3, the lid 22 has been inverted to place its face 33 uppermost and its face 32 facing the row of cable guide members 24, thus securing the lid at the lower of its two selectable heights above the guide members, for example to retain smaller cables of 5-7 mm diameter.

Figure 5:
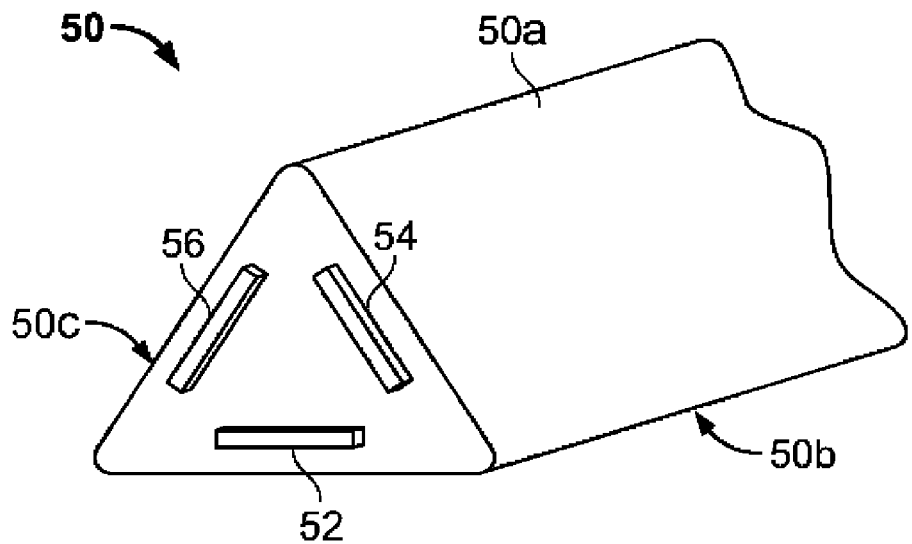
FIGS. 5 and 6 show in perspective an end of possible lids of respectively triangular and square prism form.
Figure 6:
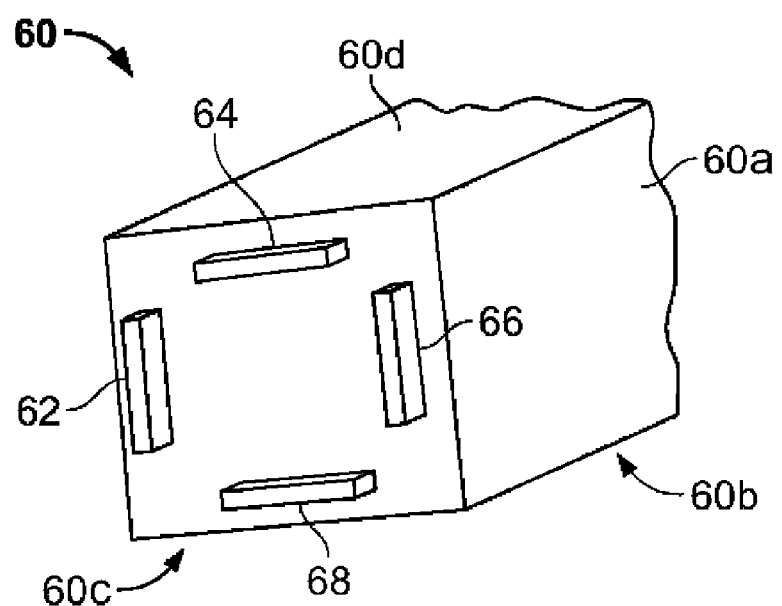

FIGS. 5 and 6 show conceivable alternative forms of lid for the cable retention clips of this invention, the lid 50 in FIG. 5 having the form of a triangular prism with three main faces 50a, 50b, 50c, and the lid 60 in FIG. 6 having the form of a square prism with four main faces 60a, 60b, 60c, 60d. Projecting clip-engagement members 52, 54, 56 in FIG. 5 and 62, 64, 66, 68 in FIG. 6 are provided at the ends of these lids to function in a manner similar to the clip-engagement members 36 of the preferred lid shown in FIGS. 2 to 4. The respective clip-engagement members are differently spaced from the planes of their respectively adjacent faces of the lids, thus enabling any one of the faces to be positioned facing the row of cable guide members 24 and secured by engagement of the respective clip-engagement members with the lid-retaining clips 28 to position the selected face of the lid at a height determined by the spacing of the related clip-engagement member from the selected main face. For example, in FIG. 5 it can be seen that cables of relatively larger diameter could be accommodated by snapping the clip-engagement projections 52 into the lid-retaining clips 28, thus positioning the face 50b relatively high above the cable guide members; cables of intermediate diameter could be secured by snapping the clip-engagement projections 54 into the lid-retaining clips 28, thus positioning the face 50a at intermediate height above the cable guide members; and relatively smaller cables could be secured by snapping the clip-engagement projections 56 into the lid-retaining clips 28, thus positioning the face 50c relatively close to the cable guide members. The square-sectioned lid of FIG. 6 could be used in analogous manner to select four different cable-retaining positions.

The invention claimed is:

1. A cable retention clip attached or attachable to equipment with which a plurality of cables are or will be operatively associated, the clip comprising: a row of upstanding open-topped cable guide members having movable arms configured to retain cables of at least a first diameter and a second diameter the first diameter beingreater than the second diameter; and a semi-flexible or substantially rigid lid securable on top of the guide members to retain cables when present therein, the lid including at least a first face and a second face, wherein upstanding lid-retaining clips are associated with the cable guide members, and the lid is formed to be selectively engageable with the lid-retaining clips to retain cables of at least the first and second diameters, the lid further comprising clip-engagement members selectively engageable with the lid-retaining clips, the lid being configured such that the first face of the lid is secured in facing juxtaposition with the guide members at a first height from the clip-engagement members when the clip-engagement members are engaged with the lid-retaining clips and cables of the first diameter are positioned within the guide members, and the second face of the lid is secured in facing juxtaposition with the guide members at a second height from the clip-engagement members when the clip engagement members are engaged with the lid-retaining clips and cables of the second diameter are positioned within the guide members, the first height being less than the second height.

2. A cable retention clip according to claim 1, wherein the lid-retaining clips are situated at the respective ends of the row of guide members.

3. A cable retention clip according to claim 1, wherein the lid-retaining clips have two or more ledges at different heights engageable by the lid.

4. A cable retention clip according to claim 1, wherein the lid is generally plate-like and the clip-engagement members are selectively engageable with the lid-retaining clips in two orientations to bring one of the first and second faces into the said facing juxtaposition at different heights from each other.

5. A cable retention clip according to claim 4, wherein the lid has a single set of clip-engagement members and the first and second faces lie in parallel planes separated by different distances from the clip engagement members.

6. A cable retention clip according to claim 1, wherein the cable guide members are curved to permit snap-fitting of cables therein.

7. A cable retention clip according to claim 1, wherein the cable guide members have means for attachment, preferably snap-fit attachment to the said equipment.

8. A cable retention clip according to claim 1, wherein a plurality of the guide members are integrally connected together.

9. A cable retention clip according to claim 1, when which is installed on a telecommunications patch panel.

10. the cable retention clip of claim 1, wherein the lid includes a plurality of depressions spaced apart by a plurality of reinforcing members.

11. The cable retention clip of claim 10, wherein the depressions are apertures extending between the first and second faces of the lid.

12. The cable retention clip of claim 1, wherein the first and second faces are coupled together in a substantially oblique arrangement.

13. The cable retention clip of claim 12, wherein the clip-engagement members include a first set and a second set, the first set is substantially parallel to the first face of the lid and the second set is substantially parallel to the second face of the lid.

14. The cable retention clip of claim 12, wherein the lid generally defines a triangular prism having the first face, the second face, and a third face, each of the faces are configured to be in facing juxtaposition with the guide members.

15. The cable retention clip of claim 12, wherein the lid generally defines a rectangular prism having the first face, the second face, a third face, and a fourth face, each of the faces are configured to be in facing juxtaposition with the guide members.

16. The cable retention clip of claim 1, wherein the first diameter is at least eight millimeters and the second diameter is at least five millimeters.

17. The cable retention clip of claim 1, wherein cables retained by the guide members extend from the guide members in a longitudinal direction, the first face of the lid defining a longitudinal dimension in the longitudinal direction when in facing juxtaposition with the guide members, and the second face of the lid defining a longitudinal dimension in the longitudinal direction when in facing juxtaposition with the guide members, the longitudinal dimensions of the first and second faces being substantially equal.

* * * * *